(12) United States Patent
Van Hillo

(10) Patent No.: US 10,548,330 B2
(45) Date of Patent: Feb. 4, 2020

(54) DESKINNING APPARATUS AND METHOD FOR DESKINNING A POULTRY LEG OR PART OF A POULTRY LEG

(71) Applicant: Meyn Food Processing Technology B.V., Oostzaan (NL)

(72) Inventor: Eric Adriaan Van Hillo, Oostzaan (NL)

(73) Assignee: Compagnie Generale Des Etablissements Michelin, Clermont-Ferrand (FR)

( * ) Notice: Subject to any disclaimer, the term of this patent is extended or adjusted under 35 U.S.C. 154(b) by 0 days.

(21) Appl. No.: 16/190,276

(22) Filed: Nov. 14, 2018

(65) Prior Publication Data
US 2019/0142021 A1    May 16, 2019

(30) Foreign Application Priority Data

Nov. 16, 2017   (NL) .................................... 2019926

(51) Int. Cl.
*A22C 21/00* (2006.01)
(52) U.S. Cl.
CPC ...... *A22C 21/0092* (2013.01); *A22C 21/0053* (2013.01)
(58) Field of Classification Search
CPC ..... A22C 17/12; A22C 25/17; A22C 21/0046; A22C 21/0092; A22B 5/16
USPC .............................. 452/125, 127–130, 83–85
See application file for complete search history.

(56) References Cited

U.S. PATENT DOCUMENTS

| 5,098,336 | A  | * | 3/1992 | DeLong | A22B 5/166 |
|---|---|---|---|---|---|
|  |  |  |  |  | 452/111 |
| 5,186,680 | A | * | 2/1993 | Conaway | A22C 21/0092 |
|  |  |  |  |  | 452/111 |
| 5,248,277 | A |  | 9/1993 | Bos et al. |  |
| 6,579,164 | B1 | * | 6/2003 | Groth | A22B 5/161 |
|  |  |  |  |  | 452/125 |
| 7,070,493 | B2 | * | 7/2006 | Hazenbroek | A22C 21/0053 |
|  |  |  |  |  | 452/130 |
| 7,662,031 | B1 | * | 2/2010 | Gasbarro | A22C 17/12 |
|  |  |  |  |  | 452/130 |
| 7,967,558 | B2 |  | 6/2011 | Janssen et al. |  |

(Continued)

FOREIGN PATENT DOCUMENTS

| EP | 0 519 570 | 6/1992 |
|---|---|---|
| WO | WO2008/078982 | 7/2008 |
| WO | WO2015/072851 | 5/2015 |

OTHER PUBLICATIONS

PCT Search Report for application NL 2019926, dated Nov. 16, 2017.

*Primary Examiner* — Richard T Price, Jr.
(74) *Attorney, Agent, or Firm* — Dority & Manning, P.A.

(57) ABSTRACT

Method and apparatus for deskinning a poultry leg or part of a poultry leg that may use a conveyor with conveyor elements from which the poultry leg or part of the poultry leg is suspendable, and substantially horizontal or slightly slanting cooperating bottom rollers below the conveyor that can be rotatable in opposite directions and provided with meshing teeth for stripping the skin from the poultry leg or part of the poultry leg, and wherein a set of top rollers can be provided above the bottom rollers and below the conveyor for contacting opposite sides of the poultry leg or part of the poultry leg.

24 Claims, 2 Drawing Sheets

(56) References Cited

U.S. PATENT DOCUMENTS

| | | | |
|---|---|---|---|
| 8,690,646 B1* | 4/2014 | Kielian | A22C 25/17 452/125 |
| 8,840,448 B1* | 9/2014 | Kielian | A22C 25/17 452/125 |
| 9,028,304 B2* | 5/2015 | De Vos | A22C 21/0092 452/128 |
| 9,596,869 B2 | 3/2017 | Bos et al. | |
| 2010/0029186 A1 | 2/2010 | Janssen et al. | |
| 2016/0270413 A1 | 9/2016 | Bos et al. | |

* cited by examiner

DESKINNING APPARATUS AND METHOD FOR DESKINNING A POULTRY LEG OR PART OF A POULTRY LEG

PRIORITY STATEMENT

The present application claims priority under 35 U.S.C. § 119 to Dutch Application No. 2019926, filed Sep. 16, 2017.

FIELD OF THE INVENTION

The subject matter of the present disclosures relates generally to deskinning a poultry leg or part of a poultry leg.

BACKGROUND OF THE INVENTION

A method and apparatus are known from EP 0 519 570, in which document a leg skin stripping device is provided below the path of a conveyor. This known device includes two parallel helical rollers, which mesh and can rotate in opposite directions with respect to each other and in such a way that the skin of a leg dragging over the rollers is pulled into the nip of the rollers and is thereby stripped off the leg. If desired the device can be disposed slanted relative to the conveyor. The known device is particularly arranged for processing drumsticks, for which purpose the known device also comprises cutting means to cut into the skin of the poultry leg in the vicinity of the knee joint.

Apparently EP 0 519 570 does not operate satisfactorily because the applicant of EP 0 519 570 developed another system for skin removal from defeathered whole legs or drum-sticks as set forth in WO2015/072851. In WO2015/072851, the system of EP 0 519 570 is discussed and it is admitted that the prior art system of EP 0 519 570 is not satisfactory in view of the skin removal results. In particular skin may become torn and is only fractionally removed requiring undue manual trimming of the poultry product later on. Also occasionally damaged meat of the drumstick or thigh is observed.

WO2015/072851 proposes to overcome the problems of EP 0 519 570 by applying a carousel machine and multiple skin removal assemblies journaled to revolve about a vertical main axis, wherein the skin removal assemblies are synchronized with the passage of poultry product carriers along a circular track portion around the carousel machine. This would allegedly result in significant improvements in the skin removal process because of a longer duration of engagement between the skin removal assemblies and the poultry leg or part of the poultry leg being processed. It is admitted, however, by WO2015/072851 that these benefits are achieved due to a relatively slower and more gentle removal of the skin due to a reduced speed of rotation of the skinning rollers, resulting in less undue tearing of skin and less potential for damage to the meat.

The admitted lower processing speed of WO2015/072851 is a big disadvantage in current high-speed processing lines, not to mention the big disadvantage of having to apply multiple skin removal assemblies to cooperate with the carousel machine. Apparently the applicant of WO2015/072851 has resorted to the commonly known carousel machine in the expectation that applying this carousel machine, which has been a welcome solution with many advantages in very different poultry processing applications since the 70s of the previous century, would also result into a successful application when applied to the deskinning operation on poultry legs and parts of poultry legs.

WO2008/078982 applies top rollers above bottom rollers in an apparatus for removal of the back skin of a poultry carcass. This apparatus is however not equipped nor suited to remove the skin from a poultry leg or part of a poultry leg. Accordingly the skilled person would not turn to this document when resolving a problem of an apparatus aimed at removing the skin from a poultry leg or part of a poultry leg.

Embodiments of the instant invention follow, however, an entirely different route in overcoming the problems of EP 0 519 570, wherein high-speed processing remains available and wherein the huge costs of WO2015/072851 can be avoided.

SUMMARY OF THE INVENTION

An exemplary method and apparatus for deskinning of poultry legs or part of poultry legs is proposed in accordance with one or more of the appended claims. In one exemplary aspect, the invention relates to a method and an apparatus for deskinning a poultry leg or part of a poultry leg, using a conveyor with conveyor elements from which the poultry leg or part of the poultry leg is suspendable, and substantially horizontal or slightly slanting cooperating bottom rollers below the conveyor that are rotatable in opposite directions and are provided with meshing teeth for stripping the skin from the poultry leg or part of the poultry leg.

A set of top rollers may be provided above the bottom rollers and below the conveyor for contacting opposite sides of the poultry leg or part of the poultry leg. These top rollers can effectively assist and promote the deskinning operation of the bottom rollers on the poultry leg or part of the poultry leg. The rollers can be placed in a linear machine, or in a machine with a curved track. The shape of the track is not essential and can be elected to answer to the needs of the particular situation.

The top rollers and bottom rollers may have an individual drive. In one exemplary aspect, the top rollers and the bottom rollers have a common drive. Apart from saving on costs, it is easier to attune the operational effectivity of the top rollers and the bottom rollers to each other when the sets of rollers share the same drive. For the avoidance of doubt. it is remarked that this need not necessarily mean that the top rollers and the bottom rollers have the same circumferential speed. On the contrary, usually the circumferential speed of the top rollers is slightly higher than the circumferential speed of the bottom rollers in order to effectively feed the skin of the leg towards the bottom rollers.

In another exemplary aspect, the top rollers are rotatable in opposite directions and non-engaging so as to define a nip between the top rollers in which the poultry leg or part of the poultry leg is receivable, wherein during use the top rollers engage the poultry leg or part of the poultry leg for exercising a downward force on the poultry leg or part of the poultry leg and for urging the skin of the poultry leg or part of the poultry leg towards the bottom rollers. The operational effectiveness of the bottom rollers is thus enhanced, which even makes possible to further extend the line speed of the conveyor to meet higher processing speed demands.

In another exemplary aspect, it is found beneficial that from every set of bottom rollers and top rollers, the rollers that during use are on a same side of the poultry leg or part of the poultry leg are rotatable in the same direction, which direction is opposite to the rotational direction of the rollers that are on an opposite side of the poultry leg or part of the poultry leg.

Although it is possible to apply top rollers with a smooth outer surface, in one exemplary aspect the top rollers are provided with grooves and/or teeth. The grooves and/or teeth promote the stripping down of the skin towards the bottom rollers. The teeth may be pointed teeth.

For the type or shape of the grooves there are several options. In one exemplary embodiment, the grooves are straight or linear grooves in a longitudinal direction of the rollers, also referred to as longitudinal grooves. In an alternative embodiment, the grooves are helical grooves.

Another exemplary aspect of the invention is that the top rollers and/or the bottom rollers may be provided with extremities that are at least in part cone-shaped. Such cone-shaped extremities form the entrance of the rollers and assist in guiding the poultry leg or part of the poultry leg along their most proper path towards the effective portion of the rollers that follows their entrance. In the effective portion of the rollers the top rollers and the bottom rollers can then effectively deskin the poultry leg or part of the poultry leg. The cone-shaped extremities makes the apparatus for deskinning less sensitive for the application of a feed trough, which can also be applied to guide the poultry leg or part of the poultry leg to the rollers.

The invention will hereinafter be further elucidated with reference to the drawing of exemplary embodiments of a deskinning apparatus of the invention that is not limiting as to the appended claims

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Whenever in the figures the same reference numerals are applied, these numerals refer to the same parts.

DETAILED DESCRIPTION OF THE INVENTION

Figure 1:
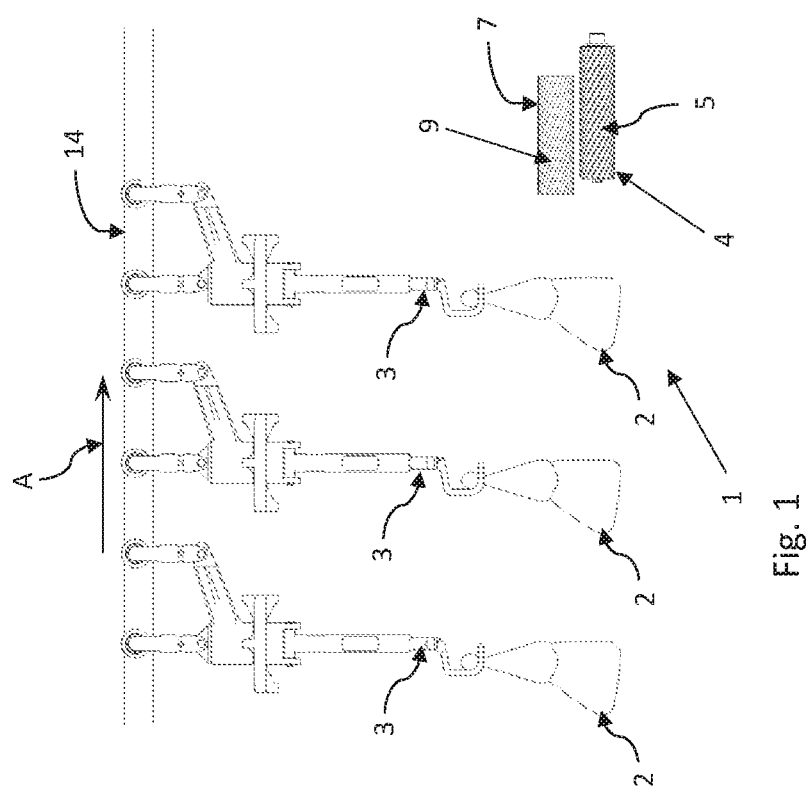
FIG. 1 shows a side view to an exemplary deskinning apparatus of the present invention.

With reference first to FIG. 1, an exemplary deskinning apparatus 1 of the invention is shown which is used for removing the skin of a complete poultry leg 2 or of a part of a poultry leg, such as a drumstick or a thigh.

Figure 3:
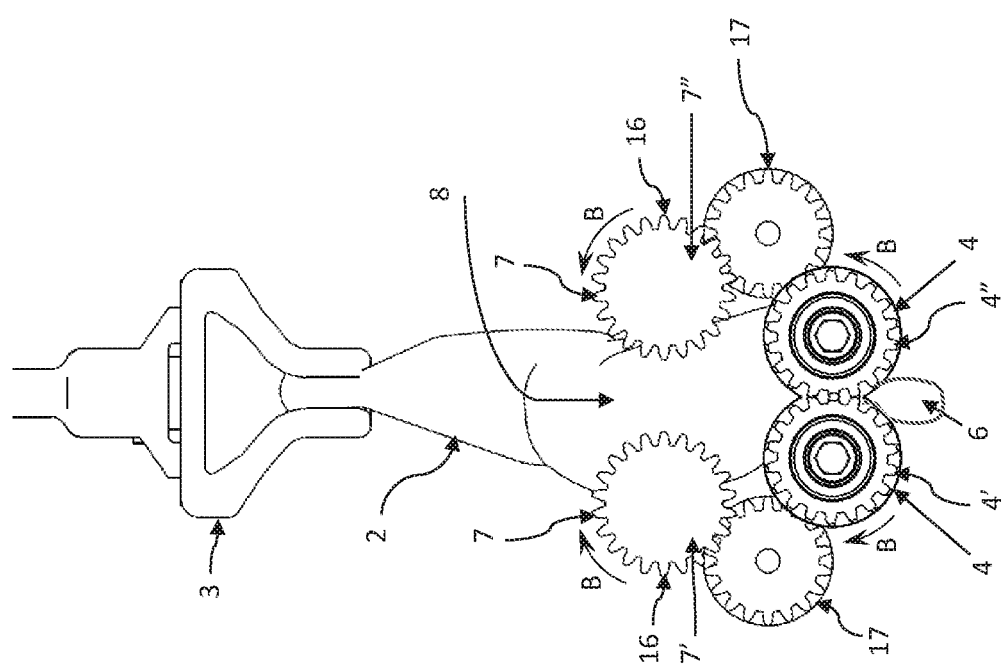
FIG. 3 shows a back view at the rollers of an exemplary deskinning apparatus of the invention.

The exemplary deskinning apparatus 1 includes a conveyor 14 with conveyor elements 3, usually shackles, from which the poultry leg 2 or part of the poultry leg is suspended. The conveyor elements 3 move in the conveying direction indicated with arrow A towards substantially horizontal cooperating bottom rollers 4 below the conveyor 14. In FIG. 1 1 only one bottom roller 4 is visible; the other one being behind the visible bottom roller. The bottom rollers 4 are rotatable in opposite directions as indicated with arrows B as is shown in FIG. 3. As can also be seen in FIG. 3, the bottom rollers 4 are provided with meshing teeth. FIG. 1 shows that the teeth can be in the form of helical grooves 5, which are used for stripping the skin 6 (FIG. 3) from the poultry leg 2 or part of the poultry leg. It is remarked that instead of the helical grooves 5, the grooves of the bottom rollers 4 can also be longitudinal (linear or straight) grooves or a series of pointed teeth.

Figure 2:
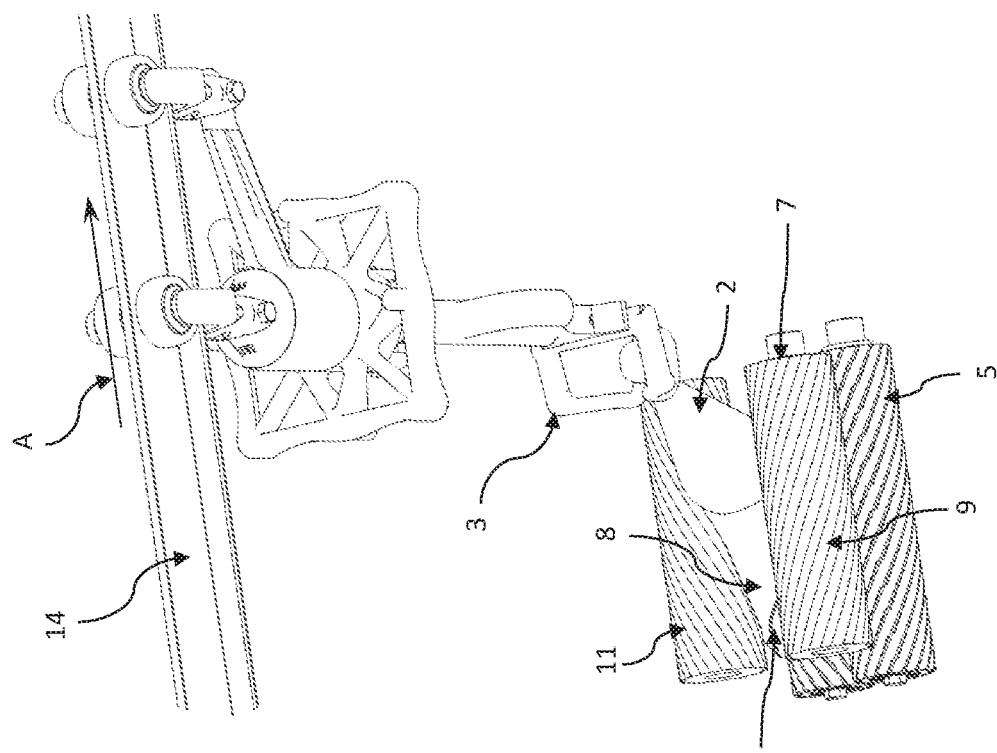
FIG. 2 shows a detailed side view near the top rollers of an exemplary deskinning apparatus of the invention.

Both FIGS. 1 and 3 show that in accordance with the invention a set of top rollers 7 is provided above the bottom rollers 4. FIG. 1 shows that the top rollers 7 are placed below the conveyor 14. FIGS. 2 and 3 clearly show that the top rollers 7 do not engage each other but are arranged for contacting opposite sides of the poultry leg 2 or part of the poultry leg. Accordingly the non-engaging top rollers 7 define a nip 8 between the top rollers 7, in which the poultry leg 2 or part of the poultry leg is received. The skilled person understands that the top rollers 7 engaging the poultry leg 2 or part of the poultry leg exercise a downward force on the poultry leg 2 or part of the poultry leg and urges the skin 6 of the poultry leg 2 or part of the poultry leg towards the bottom rollers 4.

FIG. 3 shows that the top rollers 7 and the bot-tom rollers 4 have a common drive 17 for this exemplary embodiment.

Although it is not shown in the drawing of the figures, in one exemplary aspect it is preferable that the rollers 7 of the set of top rollers are resiliently mounted on a supporting construction so as to provide that the top rollers 7 are self-adjusting to the dimensions of the poultry leg 2 or part of the poultry leg. The way this can be arranged is clear for the skilled person and requires no further elucidation with reference to the drawing It is further remarked that from every set of bottom rollers 4 and top rollers 7, the rollers 4', 7' that during use are in FIG. 3 on the left side of the poultry leg 2 or part of the poultry leg are rotatable in the same direction, which direction is opposite to the rotational direction of the rollers 4", 7" that are on the right side of the poultry leg 2 or part of the poultry leg in FIG. 3.

Figure 5:
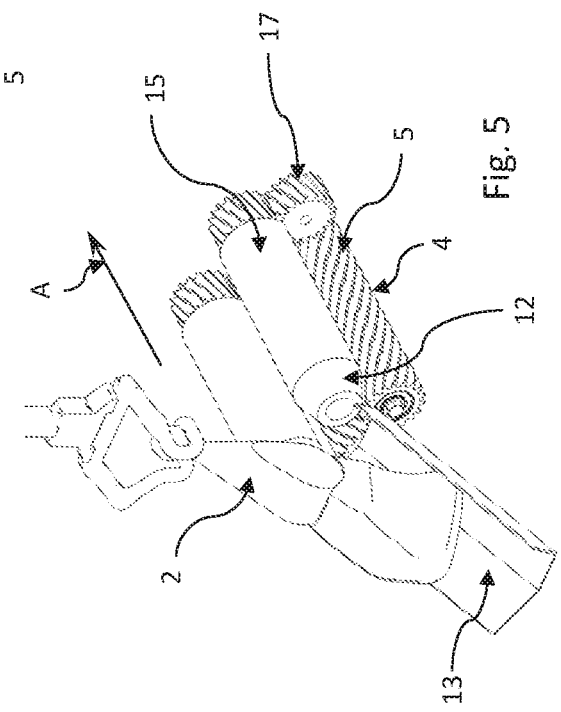
FIG. 5 depicts an oblique view at the entrance section of the rollers of the deskinning apparatus of the invention, wherein rollers with a smooth surface are applied.

As is clearly shown in FIG. 1 and FIG. 2, the top rollers 7 are provided with grooves 9 or teeth 16 that mesh with teeth 17. This is however not the only option, the top rollers 7 could also be applied without grooves or teeth but with a smooth outer surface 15 as shown in FIG. 5. FIG. 3 shows that the top rollers 7 can also be embodied with pointed teeth 16.

Figure 4:
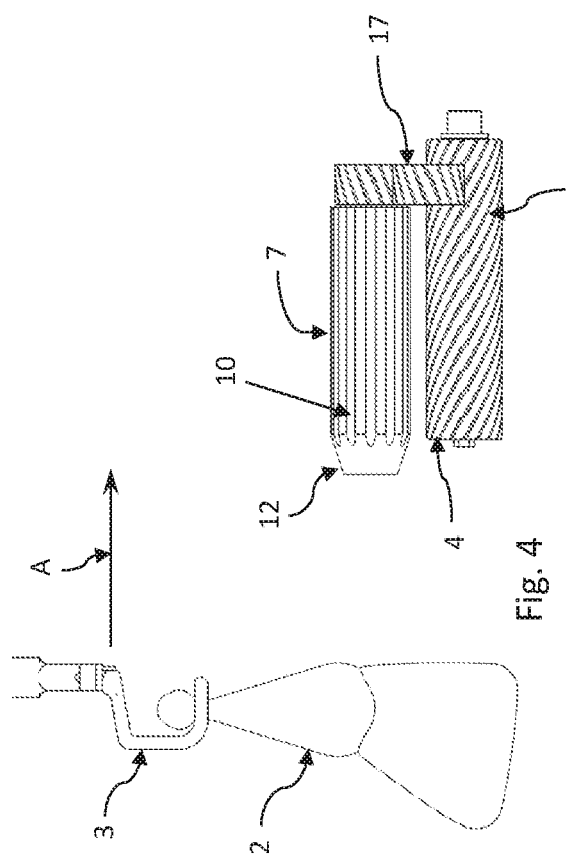
FIG. 4 depicts an exemplary embodiment in which the grooves of the top rollers are longitudinal grooves.

FIG. 4 shows an embodiment in which the grooves of the top rollers 7 are straight grooves 10 extending in a longitudinal direction of the rollers 4. FIG. 2 on the other hand shows an embodiment wherein the grooves of the top rollers 4 are helical grooves 11.

In another exemplary aspect of the invention, it is further possible that the top rollers 7 and/or the bottom rollers 4 are provided with extremities 12 that are at least in part cone-shaped. Such a cone shaped extremity 12 is shown in FIG. 4 on one of the top rollers 7. The cone shaped extremities of the top rollers 7 and/or the bottom rollers 4 serve to guide the legs 2 or part of the legs to these rollers to promote effective deskinning. Although these cone shaped extremities 12 serve the purpose of guiding, it still remains possible to apply a feeding trough 13 as depicted in FIG. 5 as a guiding instrument for the leg 2 or part of the leg to be processed.

Although the invention has been discussed in the foregoing with reference to an exemplary embodiment of the deskinning apparatus of the invention, the invention is not restricted to this particular embodiment which can be varied in many ways without departing from the invention. The discussed exemplary embodiment shall therefore not be used to construe the appended claims strictly in accordance there-with. On the contrary the embodiment is merely intended to explain the wording of the appended claims without intent to limit the claims to this exemplary embodiment. The scope of protection of the invention shall therefore be construed in accordance with the appended claims only, wherein a possible ambiguity in the wording of the claims shall be resolved using this exemplary embodiment.

The invention claimed is:

1. A deskinning apparatus for a poultry leg or part of a poultry leg, comprising:
    a conveyor with conveyor elements from which the poultry leg or part of the poultry leg is suspendable;
    cooperating bottom rollers below the conveyor that are substantially horizontal or slightly slanting relative to horizontal, the cooperating rollers rotatable in opposite directions and having meshing teeth for stripping skin from the poultry leg or part of the poultry leg; and
    a set of top rollers positioned above the bottom rollers and below the conveyor, the top rollers configured for contacting opposite sides of the poultry leg or part of the poultry leg.

2. The deskinning apparatus of claim 1, further comprising a common drive for the top rollers and the bottom rollers.

3. The deskinning apparatus of claim 1, wherein the top rollers are rotatable in opposite directions and non-engaging so as to define a nip between the top rollers in which the poultry leg or part of the poultry leg is receivable, wherein during use the top rollers engage the poultry leg or part of the poultry leg for exercising a downward force on the poultry leg or part of the poultry leg and for urging the skin of the poultry leg or part of the poultry leg towards the bottom rollers.

4. The deskinning apparatus of claim 1, wherein the top rollers are resiliently mounted on a supporting construction so as to provide that the top rollers are self-adjusting to dimensions of the poultry leg or part of the poultry leg.

5. The deskinning apparatus of claim 1, wherein rollers of the bottom rollers and the top rollers that during use are on a same side of the poultry leg or part of the poultry leg are rotatable in the same direction, which direction is opposite to a rotational direction of rollers of the bottom rollers and the top rollers that are on an opposite side of the poultry leg or part of the poultry leg.

6. The deskinning apparatus of claim 1, wherein the top rollers are provided with a smooth outer surface.

7. The deskinning apparatus of claim 1, wherein the top rollers are provided with a rough outer surface.

8. The deskinning apparatus of claim 1, wherein the top rollers are provided with at least one of grooves and teeth.

9. The deskinning apparatus of claim 1, wherein the teeth are pointed teeth.

10. The deskinning apparatus of claim 1, wherein the top rollers are provided with linear grooves extending along in a longitudinal direction of the rollers.

11. The deskinning apparatus of claim 1, wherein the top rollers are provided with helical grooves.

12. The deskinning apparatus of claim 1, wherein the top rollers, bottom rollers, or both, are provided with extremities that are at least in part cone-shaped.

13. A method for deskinning a poultry leg or part of a poultry leg, comprising
    conveying the poultry leg or part of the poultry leg above substantially horizontal or slightly slanting cooperating bottom rollers with meshing teeth;
    contacting the poultry leg or part of the poultry leg with the bottom rollers;
    providing that the rollers rotate in opposite directions for stripping skin from the poultry leg or part of the poultry leg;
    providing a set of top rollers above the bottom rollers; and
    providing that the top rollers rotate in opposite directions and engage opposite sides of the poultry leg or part of the poultry leg.

14. The method according to claim 13, further comprising providing a common drive for the top rollers and the bottom rollers.

15. The method according to claim 13, providing that the top rollers rotate in opposite directions while contacting the poultry leg or part of the poultry leg so as to exercise a downward force on the poultry leg or part of the poultry leg, and to urge the skin of the poultry leg or part of the poultry leg towards the bottom rollers.

16. The method according to claim 13, further comprising wherein the top rollers feed the skin of the poultry leg or part of the poultry leg towards the bottom rollers.

17. The method according to claim 13, wherein the rollers that share a same side of the poultry leg or part of the poultry leg rotate in the same direction, which is opposite to the rotational direction of the rollers on the opposite side of the poultry leg or part of the poultry leg.

18. The method according to claim 13, wherein the top rollers have a smooth outer surface.

19. The method according to claim 13, wherein the top rollers have a rough outer surface.

20. The method according to claim 13, wherein the top rollers have at least one of grooves and teeth.

21. The method according to claim 13, wherein the teeth are pointed teeth.

22. The method according to claim 13, wherein the top rollers have grooves that are straight or linear grooves in a longitudinal direction of the rollers.

23. The method according to claim 13, wherein the top rollers have grooves that are helical.

24. The method according to claim 13, wherein the bottom rollers, the top rollers, or both, have at least in part cone-shaped extremities.

* * * * *

UNITED STATES PATENT AND TRADEMARK OFFICE
CERTIFICATE OF CORRECTION

PATENT NO. : 10,548,330 B2
APPLICATION NO. : 16/190276
DATED : February 4, 2020
INVENTOR(S) : Eric Adriaan Van Hillo Page 1 of 1

It is certified that error appears in the above-identified patent and that said Letters Patent is hereby corrected as shown below:

On the Title Page

Item (73), please delete "Compagnie Generale Des Etablissements Michelin, Clermont-Ferrand, FR" and please insert --Meyn Food Processing Technology B.V., Oostzaan, NL--.

Signed and Sealed this
Twenty-third Day of June, 2020

Andrei Iancu
*Director of the United States Patent and Trademark Office*